United States Patent [19]

Horiuchi et al.

[11] 4,118,235
[45] Oct. 3, 1978

[54] MOLD RELEASE AGENT

[75] Inventors: Norio Horiuchi; Shin-ichi-ro Kai, both of Ibaragi; Masayoshi Shinjo, Settu, all of Japan

[73] Assignee: Daikin Kogyo Co., Ltd., Osaka, Japan

[21] Appl. No.: 723,639

[22] Filed: Sep. 15, 1976

[30] Foreign Application Priority Data

Sep. 18, 1975 [JP] Japan .................... 50-113440
Sep. 25, 1975 [JP] Japan .................... 50-116228
Sep. 30, 1975 [JP] Japan .................... 50-118583

[51] Int. Cl.² ............................................. B28B 7/36
[52] U.S. Cl. .............................. 106/38.22; 106/38.25; 106/287.13; 106/287.14; 264/338; 427/133; 427/135
[58] Field of Search .......... 106/38.22, 38.25, 287 SB, 106/287.13, 287.14; 252/49.3, 32.5; 260/955; 8/116 P; 427/133, 135; 264/338

[56] References Cited

U.S. PATENT DOCUMENTS

| | | | |
|---|---|---|---|
| 2,937,098 | 5/1960 | Geen | 106/10 |
| 3,071,479 | 1/1963 | Fulenwider, Jr. | 106/10 |
| 3,094,547 | 6/1963 | Heine | 260/955 |
| 3,112,241 | 11/1963 | Mackenzie | 162/164 |
| 3,345,424 | 10/1967 | Hauptschein et al. | 106/38.22 |
| 3,935,292 | 1/1976 | Okubo et al. | 106/38.22 |

*Primary Examiner*—Lorenzo B. Hayes
*Attorney, Agent, or Firm*—Lane, Aitken, Dunner & Ziems

[57] ABSTRACT

A composition in the form of a solution or dispersion which includes a perfluoroalkyl group-containing phosphoric acid ester of the formula

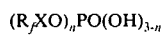

$$(R_f XO)_n PO(OH)_{3-n}$$

(wherein $R_f$ represents a perfluoroalkyl group containing from 4 to 20 carbons, X represents a divalent organic residue and $n$ is an integer from 1 to 3) and an additive which is a surface active agent, a silicone oil, a highly fluorinated organic compound, a wax or a mixture thereof, the composition being useful for imparting mold releasing properties to a mold.

11 Claims, No Drawings

MOLD RELEASE AGENT

BACKGROUND OF THE INVENTION

This invention relates to a mold release composition and more particularly to a mold release composition for use in the production of molded articles such as of polymeric materials including synthetic resins or rubbers, cement, ceramics and the like.

It is well known to use as a mold release agent natural or synthetic compounds such as silicone oil, mineral oils, waxes, aliphatic acid derivatives, glycols, etc., or inorganic substances such as talc, mica, etc., in the production of molded articles such as of polymeric materials, cement, ceramics, etc. In general, these mold release agents are applied to a mold prior to introduction of a material to be molded. When the lifetime of a mold release agent is short, the release agent is usually applied prior to every cycle in which a material is introduced to be molded. Silicone oil is most widely employed as mold release agent due to its excellent in releasing property. In the case, however, when a material having a strong adhering tendency, for example, a urethane or epoxy resin, is to be molded, it is necessary to employ silicone oil in conjunction with fine powder of silicon oxide so as to improve mechanical strength of the film of the mold release agent and, moreover, it is required to apply them to a mold in a large amount. The application of the mold release material in such a large amount leads to transfer of the mold release agent to the molded article. This makes impossible the aftertreatments of the surfaces of the molded article, e.g., a coating or adhering treatment, and is undesirable from a viewpoint of material cost.

Certain of phosphoric acid esters having a perfluoroalkyl group which are now being used as water and oil repellent because of their low surface energy are also known to have a mold releasing ability.

SUMMARY OF THE INVENTION

The present invention provides a mold release composition which comprises
(A) a perfluoroalkyl group-containing phosphoric acid ester represented by the following general formula $(R_fXO)_nPO(OH)_{3-n}$ (I)

wherein $R_f$ represents a perfluoroalkyl group containing from 4 to 20 carbon atoms, X represents a divalent organic group, and $n$ is an integer of from 1 to 3) or a salt thereof,
(B) at least one additive selected from the group consisting of a surface active agent, a silicone oil, a highly fluorinated organic compound having a boiling point above 100° C. and a wax, and
(C) a liquid carrier.

We have found that the mold releasing properties of the phosphoric acid ester containing a perfluoroalkyl group when used by itself are insufficient in a practical sense and that when a mold to which the ester compound has been once applied is reused for a molding operation, the applied ester compound loses its releasing ability after one or several cycles of the molding operation and is thus not practically employable.

We have made an intensive study of an improved mold release agent which can overcome the disadvantages involved in the known mold release agents and found that the perfluoroalkyl group-containing phosphoric acid esters or salts thereof added, in combination, with at least one substance of a specific type can overcome all the disadvantages of the prior mold release agents. It has been also found that such combinations are effective even when employed at such a low concentration of effective components of the mold release agent as below 1%, and exhibit, unexpectedly, an improved lubricating property and a prolonged releasing lifetime. The present invention is based on the above findings.

One of prominent advantages of the present invention is that the mold release agent of the invention is free from the so-called repellency phenomenon and has excellent releasing ability or efficiency and lifetime. Another advantage is that the mold release agent of the invention is free from "stickiness", so that almost no transfer of the release agent to the treated material takes place, and has an improved lubricating property. A further advantage resides in that the mold release composition of the invention also serves as an antiblocking agent, by which the articles applied with the release composition temporarily exhibit no or little tendency to block.

It is, accordingly, an object of the present invention to provide a mold release agent which can exhibit improved mold release properties.

Another object of the present invention is to provide a mold release agent having prolonged mold release lifetime.

Other objects, features and advantages of this invention will become more apparent from the detailed description to follow.

DESCRIPTION OF THE PREFERRED EMBODIMENTS

The perfluoroalkyl group-containing phosphoric acid esters suitable for the composition of the invention have a structure wherein one or more of the hydrogen atoms of the three hydroxyl groups of phosphoric acid (or orthophosphoric acid, with a chemical formula $H_3PO_4$ or $PO(OH)_3$) are substituted with an organic group having a perfluoroalkyl group containing from 4 to 20 carbon atoms. The preferred acid ester compounds are expressed by the following general formula $(R_fXO)_nPO(OH)_{3-n}$ wherein $R_f$ and $n$ have independently the same meanings as previously defined, and X is a divalent organic group expressed by $-CH_2CH(Z)C_mH_{2m}-$ or $-SO_2N(R')C_lH_{2l}$ wherein Z is H, $CH_3$, $C_2H_5$, Cl or OR (in which R is H, $CH_3$, $C_2H_5$, $COCH_3$, $COC_2H_5$ or $CH_2COOH$ or an alkali metal salt or ammonium salt thereof), $m$ is an integer of from 0 to 4, R' is an alkyl group containing from 1 to 4 carbon atoms, and $l$ is an integer of from 1 to 4. Processes for the preparation of these compounds are described in detail in U.S. Pat. Nos. 3,094,547 and 3,919,361 and Japanese Patent Publication No. 4770/1973. Examples of these perfluoroalkyl group-containing phosphoric acid esters include $[(CF_3)_2CF(CF_2CF_2)_iCH_2CH(OH)CH_2O]_nPO(OH)_{3-n}$ (in which $i$ is an integer not smaller than 1), $[C_8F_{17}SO_2N(C_2H_5)CH_2CH_2O]_nPO(OH)_{3-n}$, $(C_7F_{15}CH_2CH_2O)_nPO(OH)_{3-n}$, $(CF_3)_2CF(CF_2CF_2)_iCH_2CH_2CH_2OPO(OH)_2$ (in which $i$ is an integer not smaller than 1), $(CF_3)_2CF(CF_2CF_2)_3CH_2CH(Cl)CH_2OPO(OH)_2$, $(CF_3)_2CF(CF_2CF_2)_3CH_2CH(CH_3)OPO(OH)_2$ and $(CF_3)_2CF(CF_2CF_2)_3CH_2CH(OCH_2COOH)CH_2OPO(OH)_2$. In the composition of the present invention, the perfluoroalkyl group-containing phosphoric acid esters expressed by the above-indicated general formula (I) may be in the form of salts including, for example, alkali metal salts, ammonium salts, amine salts and the like. Of these, phosphoric acid esters of the above general formula (I) wherein $R_f$ is a perfluoroalkyl group containing from 7 to 20 carbon atoms, X is a $-CH_2CH(Z)C_mH_{2m}-$ or $-SO_2N(R')C_lH_{2l}$ in which Z is a polar atomic group such as $-OH$, $-OCH_2COOH$ or the like, R' is methyl or ethyl and m and l are independently an integer of from 1 to 3, and n is an integer of 1 or 2, and salts of the esters are preferred. The perfluoroalkyl group-containing phosphoric acid esters of the formula (I) and salts thereof may be used singly or in combination.

The phosphoric acid ester is used in conjunction with an additive selected from a substance known as a surface active agent, a silicone oil, a highly fluorinated compound having a boiling point not lower than 100° C. or a wax.

The surface active agents useful as the additive of the present invention may be any of ordinarily employed anionic, cationic, nonionic and amphoteric active agents. Examples of the preferred surface active agents include cationic active agents such as higher fatty amine hydrohalides, alkylpyridinium halides, quaternary ammonium salts, polyoxyethylene alkylamines, and the like; nonionic active agents such as polyoxyethylene alkyl ethers, polyoxyethylene alkyl esters, sorbitan alkyl esters, sugar esters, and the like; and amphoteric active agents such as of secondary and tertiary amine types, a quaternary ammonium salt type and a phosphoric acid ester type. These surface active agents may be used singly or in combination. Of the above-indicated surface active agents, a surface active agent such as, of a polyoxyethylene alkylamine type or a betaine type having both a cationic nitrogen atom ionically reactive with the perfluoroalkyl group-containing phosphoric acid ester and a hydrophilic group in the same molecule is most preferable due to excellency in mold releasing efficiency, in preventing corrosion of the mold and also in its ability to facilitate solubilization of the perfluoroalkyl group-containing phosphoric acid ester in a liquid carrier. The amount of the surface active agent is preferably in the range of 0.05 to 2 parts by weight, most preferably 0.1 to 2.0 parts by weight, per part by weight of the perfluoroalkyl group-containing phosphoric acid ester. It will be noted that addition of the surface active agent in an amount above 2 parts by weight does not lower its mold releasing properties or lifetime.

Though some surface active agents exhibit a slight releasing tendency by themselves, the releasing tendency of these agents are far poorer than those of the mold releasing agents of the present invention as will be understood from Comparative Examples and Examples which will be later described. In addition, it is known that when these surface active agents having a light releasing tendency are added to a silicon-base release agent, the releasing ability is lowered in comparison with that of silicon-base release agent alone. On the contrary, the composition of this invention including both the surface active agent and the perfluoroalkyl group-containing phosphoric acid ester exhibits a synergestic effect on the releasing ability far superior to that attained by the perfluoroalkyl group-containing phosphotic acid ester alone. Moreover, the agent of this invention is employable even at such a low concentration as would be impossible to practically use in the case of the perfluoroalkyl group-containing phosphoric acid ester alone. Such a synergestic effect can not be attained when there is used, instead of the perfluoroalkyl group-containing phosphoric acid ester, a fluorine-contained compound which has a perfluoroalkyl group but is not a phosphoric acid ester, such as ammonium perfluorooctanoate, potassium perfluorosulfonate or $R_fCH_2CH(OH)CH_2NH(CH_2)_2NH(CH_2)_3Si(OCH_3)_3$.

The silicone oil useful in the present invention is a noncurable polysiloxane which is liquid or semi-solid at room temperature and has a boiling point of not lower than 100° C. and a melting point of not higher than 150° C. It is preferred That the polysiloxane have an alkyl group, a fluoroalkyl group, a vinyl group, a phenyl group or the like at the side chain thereof and, most preferably, a high content of methyl group.

The highly fluorinated organic compound means a compound in which hydrogen atoms capable of being fluorinated are highly fluorinated and which has a boiling point not lower than 100° C. Such compounds include highly fluorinated alkanes, inner olefins and derivatives thereof such as hexafluoropropene oligomers, polyethers such as hexafluoropropylene oxide, tetrafluoroethylene oxide, etc., and highly fluorinated amines. Examples of suitable highly fluorinated organic compounds include $(CF_3)_2CF(CF_2)_4CF-(CF_3)_2$ (b.p. 207° C.), $CF_3(CF_2)_4CCl_3$ (b.p. 143° C.), $Cl(CF_2CFCl)_3Cl$ (b.p. 203° C.), $C_2F_5CFClCF_2CRCl_2$ (b.p. 119° C.), $C_9F_{20}$ (b.p. 125° C.), $C_9HF_{19}$ (b.p. 138° C.), $CF_2Cl(CF_2)_5CHF_2$ (b.p. 123° C.), $CHF_2(CF_2)_7-CF_2Cl$ (b.p. 162° C.), $C_{11}HClF_{22}$ (b.p. 191° C.)

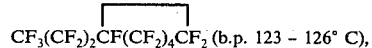
$CF_3(CF_2)_2CF(CF_2)_4CF_2$ (b.p. 123 – 126° C),

$CF_2(CF_2)_4CF(CF_2)_3CF(CF_2)_4CF_2$ (b.p. 225° C), hexafluoropropene trimer (b.p. 110°–114° C.), tetrafluoroethylene pentamer (b.p. 130°–132° C.), perfluorodecalin (b.p. 142° C.), perfluorobutyltetrahydrofuran (b.p. 102° C.), $F[CF(CF_3)CF_2O]_4CHFCF_3$ (b.p. 193° C.), $(C_4F_9)_3N$ (b.p. 174° C.), etc. Most of the above-mentioned compounds are liquid at a normal temperature and some of them are solid. All of the compounds have melting points below 150° C.

Thus, both the silicone oil and the high fluorine compound are liquid or semi-solid at room temperature and have a boiling point not lower than 100° C. and a melting point not higher than 150° C. Use of a compound having a boiling point below 100° C. is not advantageous since a fair amount of the compound is volatilized at a time of molding.

The waxes preferably usable in the present invention are vegetable waxes composed of aliphatic acid esters such as carnauba wax, candelilla wax, etc., mineral waxes such as polyethylene wax, micro wax, etc., and animal waxes such as wool wax, bees wax, etc.

The silicone oil, highly fluorinated compound and wax may be used in wide ranges of amounts and, preferably, in the range of 0.05 to 10 parts by weight, most preferably 0.2 to 5 parts by weight, per part by weight of the perfluoroalkyl group-containing phosphoric acid ester. When the respective components are each within a range of 0.05 to 10 parts by weight, the resulting mold release agent hardly transfers to a material being molded and is almost free from sticking, giving an excellent releasing efficiency.

The mold release agent of the invention can be prepared by dissolving or dispersing in liquid medium a perfluoroalkyl group-containing the phosphoric acid ester or a salt thereof and at least one additive selected from a surface active agent, a silicon oil, a high fluorine compound and a wax. In general, since the components of the mold release agent of the invention have different solubilities in a liquid carrier used in the present invention, it is preferred to change the manner of dissolving of dispersing the component materials properly depending on the kind of the liquid carrier. The preparations of the mold release agents using as the liquid carrier water and an organic solvent, respectively, will be specifically described.

Use of water as liquid medium for the mold release agent of the invention will be first described. Since the phosphoric acid ester is sparingly soluble in water, dissolving or dispersing the phosphoric acid ester in water is conducted by first dissolving the phosphoric acid ester in a water-miscible organic compound capable of dissolving the phosphoric acid ester, for example, a ketone such as acetone or an alcohol such as isopropanol, and then mixing the resulting solution with water to allow the phosphoric acid dissolved in the solution to be dissolved or dispersed in water. After the dissolving or dispersing the phosphoric acid ester in water, an alkali component may be added to the resulting solution or dispersion to convert the phosphoric acid ester to a salt. To the aqueous dispersion or solution may be then added the additive of the present invention. When a surface active agent is employed as the additive, it is directly added to the aqueous dispersion or solution.

When a silicone oil, a highly fluorinated compound or a wax is used as the additive, it is preferred that each of them is first dispersed in water by an ordinary method to prepare an aqueous emulsion and is then mixed with an aqueous dispersion or solution of the phosphoric acid ester obtained by the aforementioned method with or without the use of an emulsifier. Proper selection of an emulsifier makes it possible to simultaneously emulsify and disperse in water the silicone oil, highly fluorinated compound or wax and the phosphoric acid ester. In case where it is intended to use as the additive both the surface active agent and the silicone oil, highly fluorinated compound or wax, the manner of the preparation of the aqueous mold release agent is the same as described above.

The mold release agent which contains, as additives, the silicone oil, highly fluorinated compound or wax in addition to the surface active agent has an improved lifetime though the degree of the improvement varies depending on the kind of a material to be molded.

The organic solvents usable as the liquid medium in the present invention are, for example, alcohols such as methanol, ethanol, propanol, isopropanol, etc., ketones such as acetone, methyl ethyl ketone, methyl isobutyl ketone, etc., ethers such as ethyl ether, isopropyl ether, dioxane, tetrahydrofuran, etc., esters such as ethyl acetate, butyl acetate, etc., halogenated hydrocarbons such as carbon tetrachloride, methylene chloride, ethylene chloride, trichloroethylene, perchloroethylene, trichloroethane, trichlorofluoromethane, 1,2-difluorotetrachloroethane, 1,1,2-trichlorotrifluoroethane, etc. These organic solvents may be used singly or in combination.

When an organic solvent is used as a liquid carrier, it is advantageous that the organic solvent be able to dissolve all of the component materials to be employed. In this connection, however, there have been found only a relatively small number of organic solvents which can dissolve the phosphoric acid esters and a surface active agent, silicon oil, high fluorine compound and/or a wax at the same time. Accordingly, two or more organic solvents which are miscible with each other are used for dissolving the phosphoric acid ester and other effective components in the respective solvents and the resulting solutions are mixed with each other to obtain a uniform solution or dispersion. This will be described in more detail. The phosphoric acid ester is used as a solution in an alcohol solvent such as isopropanol, a ketone solvent such as acetone or a fluorinated and chlorinated hydrocarbon such as trichlorofluoromethane, 1,2-difluorotetrachloroethane or 1,1,2-trichlorotrifluoroethane. When silicone oil is used as another effective component, i.e., additive, the above-indicated solvents including the ketones, ethers, esters and halogenated hydrocarbons can be all employed. When a high fluorine compound is used as an additive, a fluorinated and chlorinated hydrocarbon such as trichlorofluoromethane, 1,2-diflouorotetrachloroethane or 1,1,3-trichlorotrifluoroethane can be suitably employed as a solvent. The solvents suitable for dissolving the wax are, for example, petroleum (such as kerosene, gasoline, etc.), aromatic hydrocarbons such as toluene, xylene, etc. With surface active agents, most of the aforementioned organic solvents can be suitably used.

The concentration of the mold release agent (i.e., a total concentration of a perfluoroalkyl group-containing phosphoric acid ester and an additive selected from a surface active agent, silicon oil, a high fluorine compound and a wax) in a mold release composition varies depending on the purpose in end use of the mold release agent and generally ranges from 0.1 to 50% by weight. For only one cycle of molding operation, a concentration a 0.1 wt % or less is sufficient. Where a long lifetime is required of a single application of the mold release agent, the concentration is preferably in the range of 0.5 to 20 wt %, more preferably 1 to 10 wt %.

The mold release agent of the invention may be added, if desired, with powder of silicon oxide, polytetrafluoroethylene (PTFE), fluorinated carbon or the like in order to improve mechanical strengths of a film obtained by application of the mold release agent, or may be added with a thickening, film-forming agent such as of polyvinyl alcohol, a vinyl acetate resin or the like.

Examples of molding materials to which the mold release agent of the present invention is suitably applicable include synthetic resins or rubbers such as polyurethane, chloroprene rubber, polycarbonate, fluorine-contained rubber, epoxy resin, phenolic resin, vinyl chloride resin, etc., and a variety of natural resins and natural rubber and forming materials thereof.

Application of the mold release agent to mold is feasible by conventional methods. For example, it is sufficient to apply the mold release agent of the invention to a mold by immersion, spraying, or brushing by impregnation in cloth, and then to remove the liquid medium by evaporation.

The following examples serve to further illustrate the present invention, in which parts and percentages are by weight unless otherwise defined.

EXAMPLE 1

Mold release agents having the different compositions shown in Table 1 were prepared for a release test wherein an epoxy resin was molded. The preparation of mold release agents, the release test method and test results will be described in order.

PREPARATION OF MOLD RELEASE AGENTS (1) Preparation of aqueous phosphoric acid ester solution:

10 parts of a mixture of perfluoroalkyl group-containing phosphoric acid ester having a general formula, $(CF_3)_2CF(CF_2-CF_2)_iCH_2CH(OH)CH_2O-PO(OH)_2$ (in which $i=3, 4, 5$ and 6, in a mixing ratio 5:3:2:1, respectively (by weight)) was added for dissolution to a mixed solvent heated to 60° C. and composed of 5 parts of acetone and 20 parts of isopropanol. Then, 35 parts of the resulting solution was mixed with 65 parts of water and well agitated for dissolution, thereby obtaining an aqueous solution having a pH of about 2-3. This aqueous solution was neutralized with aqueous ammonia.

(2) Preparation of mold release agents containing phosphoric acid ester and surface active agent:

To the aqueous solution of preparation (1) was added a polyoxyethylene alkylamine surface active agent "Nissan Nymeen S-220" (product of Japan Oil & Fats Co., Ltd.)in an amount of 0.25 parts of the surface active agent per part of the phosphoric acid ester, followed by agitating to obtain a solution. The thus obtained solution was diluted with water in different ratios to yield six different solutions having total concentrations of the above two components within the range of 0.05 to 5% as shown in Table 1.

(3) Preparation of mold release agents containing phosphoric acid ester, surface active agent and silicone oil:

To the mold release agent of preparation (2) was mixed "Silicon Emulsion SH-7036" (product of Toray Silicon Co.) to be an aqueous emulsion containing about 35% dimethylsiloxane with a viscosity of 350 centistokes at 25° C. such that the ratio of the silicone oil to the phosphoric acid ester was as indicated in Table 1. After agitation, the resulting solution was diluted with water in different ratios so that the concentrations of the total of the three components were in the range of 0.5-3% as shown in Table 1.

(4) Preparation of mold release agents for comparative purpose:

The aqueous phosphoric acid solution of preparation (1) was diluted with water to obtain two dilutions with concentrations of 0.5 and 1%, respectively. Further, the silicone emulsion used in Preparation (3) was diluted with water to obtain two dilutions with concentrations of 10% and 3%, respectively.

RELEASE TEST AND RESULTS

Release tests with an epoxy resin were conducted using the mold release agents prepared in the above. In Table 1, there are shown the compositions of the prepared mold release agents and the test results. The mold release test method is as given below.

1. Epoxy resin composition for release test:
   Epikote #828 (product of Shell
      International Chemicals Corp.)    100 parts
   Triethylenetetramine    10 parts
2. Mold and molding conditions:

The mold release agents were each brush-coated onto a steel mold and air-dried. The mold had a cavity having a diameter of 40 mm and a depth of 2 mm for disc molding. A pin was put at the central position of the cavity so that the molded article was readily removed after hardening. The epoxy resin composition was mixed well and placed in the mold, followed by allowing to stand for 2 hours at a normal temperature and heating and curing at 100° C. for 1 hour. Then, the pin was pulled to remove the resulting molded article (disc) from the mold, whereupon the release ability or efficiency was determined by the pulling impression according to the following standard. Release Ability Determination Standard:

5: Molded article is removed from the mold by extremely slight pulling force.
4: Removed by slight pulling force.
3: Removed by moderate pulling force.
2: Hard to be removed by fair pulling force.
1: Molded article is adhered to the mold and can not be removed by hand pulling.

After single application of a mold release agent, the lifetime of the mold release agent was determined by repeating the cycle of the molding operation, without further application of the release agent, until the releasing ability decreased down to a certain level of the determination standard. That is, a mold release agent was first applied to the mold and then the molding operation was repeated without further application of the release agent as long as the treated applied mold showed a standard level within a range not lower than 3. The lifetime of the mold release agent was determined as the number of the molding cycles before the standard level reached not higher than 2. The release ability was suddenly lowered when the number of the molding cycles approached the lifetime of the release agent, but remained almost constant up to the lifetime. The values of the release ability and the lifetime were each taken as an average value of three measurements obtained under the same conditions.

Table 1

| | per part of phosphoric acid ester | | | | |
|---|---|---|---|---|---|
| | amount of surface active agent (parts) | amount of silicone oil (parts) | concentration of mold release agent (%) | release ability | lifetime (the number of repetitions) |
| Ex. | 0.25 | 0 | 5 | 5 | 6 |
| | 0.25 | " | 3 | 5 | 6 |
| | 0.25 | " | 1 | 5 | 5 |
| | 0.25 | " | 0.5 | 5 | 4 |
| | 0.25 | " | 0.1 | 5 | 4 |
| | 0.25 | " | 0.05 | 4 | 3 |
| | 0.25 | 5 | 3 | 5 | 4 |
| | 0.25 | 3 | 3 | 5 | 8 |
| | 0.25 | 3 | 0.5 | 5 | 6 |
| | 0.25 | 0.5 | 3 | 5 | 6 |
| Comparative Ex. | phosphoric acid alone | | 1 | 3 | 2 |
| | " | | 0.5 | 2 | 0 |
| | silicone oil alone | | 10 | 1 | 0 |
| | " | | 3 | 1 | 0 |

EXAMPLE 2

A number of mold release agents were prepared using the same components as used in Example 1 and having compositions and concentrations as indicated in Table 2 shown below. The thus prepared mold release agents were subjected to a release test using urethane rubber. The test results are as shown in Table 2. The release test method is as follows.

1. Test urethane rubber compositions:
   Polyester-base prepolymer
   (Cornate 4048, product of Japan
   Polyurethane Co.) .......................... 100 parts
   Tolylenediisocyanate
   (Nipplan 4038, product of Japan
   Polyurethane Co.) .......................... 5.5 parts
2. Mold and molding conditions:

A steel mold having a cavity of a diameter of 40 mm together with a depth of 2 mm and a wire pull of a L form provided at the central portion thereof to permit the molded article to be removed by hand.

Cornate was placed in a flask and degassed while agitating at 75° C. under a reduced pressure of 5–10 mmHg, and heated to a temperature of 80°–85° C. Thereafter, Nipplan was quickly added to the heated cornate under reduced and agitated conditions. 5 min after the addition, the agitation was stopped, but the mixture was maintained under the reduced pressure for 5 min. to obtain a liquid rubber composition. Meanwhile, a mold release agent was applied to the mold by brushing, air-dried and heated to 120° C. Into the heated mold was introduced the liquid rubber composition, followed by heating and curing at 120° C. for 50 min. The release ability and the lifetime were determined in the same manner as in Example 1.

Table 2

| | per part of phosphoric acid ester | | | |
|---|---|---|---|---|
| | amount of surface active agent (parts) | amount of silicone oil (parts) | concentration of mold release agent (%) | release ability | lifetime (the number of repetitions) |
| Ex. | 0.25 | 0 | 1 | 4–5 | 4 |
| | 0.25 | 0 | 3 | 5 | 4 |
| | 0.25 | 5 | 1 | 5 | 5 |
| | 0.25 | 2 | 1 | 5 | 5 |
| | 0.25 | 2 | 3 | 5 | 7 |
| | 0.25 | 0.5 | 1 | 5 | 5 |
| | 0.25 | 0.5 | 3 | 5 | 5 |
| Comparative Ex. | silicone oil alone | | 1 | 1 | 0 |
| | " | | 30 | 1 | 0 |
| | phosphoric acid ester alone | | 1 | 4 | 1 |
| | · | | 3 | 4 | 2 |

EXAMPLE 3

A various kinds of mold release agents having components and compositions as indicated in Table 5 were prepared for conducting a release test using rigid urethane foam. The test results are as shown in Table 5.

Though the general procedure for the preparation of mold release agents were almost the same as in the case of Example 1, the respective components and the preparation method which differ from those of Example 1 are described below.

COMPONENTS OF MOLD RELEASE AGENTS AND PREPARATION METHOD:

In table 5, the phosphoric acid esters employed are indicated by letters A, B . . . , corresponding to compounds having the following chemical structures. It will be noted that $n$ of Table 5 means a value of $n$ in the following general formulae. The phosphoric acid ester compounds, other than the salts, were dissolved in water by a method as illustrated in Example 1-(1). When the phosphoric acid ester was used in the form of a salt, it was prepared by neutralizing, with alkalis or amines corresponding to the salt, the aqueous solution of the phosphoric acid ester compound which had been prepared by the same method hereinabove.

(A) $[(CF_3)_2CF(CF_2CF_2)_3CH_2CH(OH)CH_2O]_n\text{-}PO(OH)_{3-n}$
(B) $[C_8F_{17}SO_2N(C_2H_5)CH_2CH_2O]_nPO(OH)_{3-n}$
(C) $[C_7F_{15}CH_2CH_2O]_nPO(OH)_{3-n}$
(D) $[(CF_3)_2CFCF_2CF_2CH_2CH_2CH_2O]_nPO(OH)_{3-n}$
(E) $[(CF_3)_2CF(CF_2CF_2)_3CH_2CH(Cl)CH_2O]_nPO(OH)_{3-n}$
(F) $[(CF_3)_2CF(CF_2CF_2)_3CH_2CH(CH_3)O]_nPO(OH)_{3-n}$
(G) $[(CF_3)_2CF(CF_2CF_2)_3CH_2CH(OCH_2COOH)CH_2O]_nPO(OH)_{3-n}$ The surface active agents employed are also briefly shown in Table 5 by figures, which are intended to mean compounds as shown in Table 3 below. The amount of surface active agent in Table 5 means parts by weight to one part by weight of the phosphoric acid ester.

Table 3

| letter | commercial name | compound | producing or selling company |
|---|---|---|---|
| (1) | Nissan Nyoneen S-220 | polyoxyethylene alkylamine | Japan Oil and Fats Co., Ltd. |
| (2) | Nissan Nonion O-2 | polyoxyethylene monooleate | " |
| (3) | Nissan Nonion HS 208 | polyoxyethylene octylphenylether | " |
| (4) | Nissan Trax K-40 | aqueous solution of about 35% sulfuric ester salt of polyoxyethylene alkyl ether | " |
| (5) | MEGAFAC 142 | $C_8F_{17}SO_2NR(CH_2CH_2O)_nH$ | Dainippon Ink and Chemicals Inc. |
| (6) | Noigen EA-80 | polyoxyethylene alkylphenol ether | Daiichi Kogyo Seiyaku Co., Ltd. |
| (7) | — | sodium dodecylbenzenesulfonate | — |

Silicone oils and highly fluorinated compounds employed are also shown by small letters in Table 5. These oils and compounds are particularly indicated in Table 4 below together with commercial names and the producing and selling companies, respectively.

Table 4

| letter | commercial name | compound | producing or selling company |
|---|---|---|---|
| (a) | Toray Silicon SH 200 | dimethylsiloxane (with a viscosity of 1000 | Toray Silicon Co. |

Table 4-continued

| letter | commercial name | compound | producing or selling company |
|---|---|---|---|
| (b) | Fluorosilicon FS1265 | fluorosilicone oil (c.st.) | " |
| (c) | Silicon Emulsion SH-7036 | aqueous 35% emulsion of dimethylsiloxane (with a viscosity of 350 c.st.) | " |
| (d) | Daifloyl No. 1 | liquid mainly composed of $Cl(CF_2CFCl)_3Cl$ | Daikin Kogyo Co., Ltd. |
| (e) | — | hexafluoropropene dimer | — |
| (f) | — | $(CF_3)_2CF(CF_2)_8CF(CF_3)_2$ | — |
| (g) | — | $F(CFCF_2O)_4CHFCF_3$<br>$\quad\vert$<br>$\quad CF_3$ | — |

The amounts of the silicone oils and the highly fluorinated compounds are each shown by parts per one part of the phosphoric acid ester.

In the preparation of mold release agents containing these silicone oils and highly fluorinated compounds, each was first mixed with about 10% of corresponding surface active agent shown in Table 5, and further water was gradually added while agitating at high speed, thereby producing an emulsion having a silicone oil or a highly fluorinated compound concentration of about 30%. (The above procedure is not required if the silicone oil or highly fluorinated compound is commercially available in the form of an emulsion.) Then, the emulsion was mixed with an aqueous phosphoric acid ester solution which had been prepared according to the method of Example 1-(1), with stirring.

For comparative purposes, mold release agents consisting of a phosphoric acid ester alone, a silicone oil alone (as a toluene solution) without containing any phosphoric acid ester, a silicone oil and a surface active agent, and a high fluorine compound and a surface active agent was prepared fundamentally in the same manner as described above. That is, an aqueous emulsion of a silicone oil or a high fluorine compound was first prepared by a conventional procedure and then added with a surface active agent.

Release Test Method

1. Rigid Urethane foam composition for the release test:

| Solution A | |
|---|---|
| PPG-SU-450L (polyol produced by Mitsui Toatsu Ind. Co.) | 100 parts |
| $CCl_3F$ (foaming agent) | 44 parts |
| triethylenediamine | 0.3 parts |
| N,N-dimethylethanolamine | 1.5 parts |
| L-5320 (foam uniformer produced by Japan Unica Co.) | 1.5 parts |
| Solution B | |
| 4,4-diphenylmethane diisocyanate | 115.4 parts |

2. Test conditions

Each mold release agent was applied onto an aluminium plate by brushing and air-dried. Then, the solutions A and B were mixed with each other and immediately slantingly applied onto the aluminium plate, followed by foaming and hardening at room temperature of 25° C. The hardened material was allowed to stand for 1 hour and the release ability of the tested release agent was determined by pulling by hand in accordance with the following determination standard.

Release ability determination standard
5: Removed only by slanting the aluminium plate.
4: Removed only by slight hand force.
3: Removed by fair force.
2: When removed by hand, part of the cured material surface which was contracted with the aluminium plate was broken by adhesion.
1: When removed by hand, most of the cured material surface attached to the aluminium plate was broken.

The procedures for the determination of release ability and lifetime are the same as in the release test of an epoxy resin in Example 1.

Table 5

| | experiment No. | phosphoric acid ester kind | n | surface active agent kind | amount (parts) | silicone oil or high fluorine compound kind | amount (parts) | concentration of mold release agent (%) | release ability | lifetime (the number of repetitions) |
|---|---|---|---|---|---|---|---|---|---|---|
| Ex. | 1 | (A) | 1 | (1) | 0.33 | — | 0 | 1 | 5 | 15 |
| | 2 | (A) | 1 | (5) | 0.1 | (e) | 1 | 1 | 5 | 17 |
| | 3 | $NH_4$ salt of (A) | 2 | (1) | 0.33 | — | 0 | 1 | 5 | 13 |
| | 4 | (A) | 2 | (1) | 0.33 | — | 0 | 1 | 5 | 11 |
| | 5 | (A) | 1–3 (average =1.4) | (1) | 0.33 | — | 0 | 1 | 5 | 13 |
| | 6 | $NH_4$ salt of (A) | " | (2) | 1 | (a) | 2 | 1 | 5 | 16 |
| | 7 | diethanolamine salt of (A) | " | (2) | 0.1 | — | 0 | 1 | 4—5 | 13 |
| | 8 | (A) | " | (2) | 1 | (b) | 1 | 1 | 5 | 15 |
| | 9 | $NH_4$ salt of (A) | " | (5) | 0.25 | (f) | 3 | 1 | 5 | 17 |
| | 10 | (B) | 1 | (3) | 0.25 | — | 0 | 1 | 5 | 10 |
| | 11 | (B) | 1 | (6) | 0.25 | (d) | 2 | 1 | 4—5 | 9 |
| | 12 | (B) | 1–2 | (2) | 0.5 | (a) | 1 | 1 | 5 | 12 |
| | 13 | (C) | 1 | (5) | 0.25 | (g) | 1 | 1 | 4—5 | 6 |
| | 14 | Na salt of (D) | 1 | (7) | 0.25 | — | 0 | 1 | 4—5 | 7 |
| | 15 | (E) | 1 | (3) | 0.33 | — | 0 | 1 | 4—5 | 8 |
| | 16 | $NH_4$ salt of (F) | 1 | — | 0 | (c) | 3 | 1 | 5 | 10 |
| | 17 | $NH_4$ salt of (G) | 1 | (4) | 0.33 | — | 0 | 1 | 5 | 2 |
| | 18 | $NH_4$ salt of (A) | 1–3 | (2)/ | 0.29 | (a)/ | 2.5 | 1 | 5 | 14 |

Table 5-continued

| experiment No. | phosphoric acid ester | | surface active agent | | silicone oil or high fluorine compound | | concentration of mold release agent (%) | release ability | lifetime (the number of repetitions) |
|---|---|---|---|---|---|---|---|---|---|
| | kind | n | kind | amount (parts) | kind | amount (parts) | | | |
| | | average =1.4 | (5) = 4/3 | | (f) = 2/3 | | | | |
| Comparative Ex. 1 | (A) | 1–3 | — | — | — | — | 1 | 5 | 2 |
| 2 | diethanolamine salt of (A) | " | — | — | — | — | 1 | 3 | 1 |
| 3 | NH$_3$ salt of (B) | 1 | — | — | — | — | 1 | 4 | 2 |
| 4 | — | | (a) alone (toluene solution) | | | | 3 | 3 | 0 |
| 5 | — | | (a)/(2) = 5/1 | | | | 3 | 2 | 0 |
| 6 | — | | (b)/(2) = 5/1 | | | | 3 | 3 | 0 |
| 7 | — | | (g)/(5) = 5/1 | | | | 3 | 4 | 1 |
| 8 | — | | (c)/(8)* = 2/1 | | | | 3 | 2 | 0 |

*:ammonium perfluorooctanoate

EXAMPLE 4

A mold release agent having a concentration of 1% was prepared in the same manner as in Example 1 using 0.2 parts of polyoxyethylene alkylamine-base surface active agent "Nissan Nymeen S-215" per part of an NH$_4$ salt of the same phosphoric acid ester as used in Example 1. This release agent was used for conducting a peeling test using fluorine-containing rubber. The fluorine-containing rubber composition and the mold and vulcanization conditions are as follows.

1. Fluorine-containing rubber composition for the release test:

| | | |
|---|---|---|
| Dai-el G701 (fluorine-containing rubber produced by Daiken Kogyo Co., Ltd.) | 100 | parts |
| MT-carbon black powder | 20 | parts |
| magnesium oxide powder | 3 | parts |
| calcium hydroxide powder | 6 | parts |
| vulcanizing agent for fluorine containing rubber V-5 (product of Daiken Kogyo Co., Ltd.) | 0.5 | parts |

2. Molding and vulcanizing conditions:

Three aluminium plates each having a size of 30 mm × 60 mm × 1 mm were first provided, one of which was coated with the above-mentioned release agent by brushing and then air-dried. Another plate was coated with Frekote 33 (surface release agent containing a siloxane structure produced by American Frekote Corp.), followed by baking at 170° C. for 20 min. The other plate was not treated at all. The three aluminium plates were put on the bottom of a mold having a size of 90 mm × 60 mm such that the treated surfaces faced upwards. Then, the kneaded material of the fluorine-containing rubber composition was filled in the mold, which was then covered with a cope having an excellent release property. The filled rubber composition was press molded at a temperature of 170° C. for 10 min and under a pressure of 30 kg/cm$^2$. The molded rubber layer had a thickness of about 1 mm. After completion of the molding, the cope was removed and the molded rubber was carefully handled so as not to separate the aluminium plates from the rubber layer. The rubber layer was cut to separate the three aluminium plates from one another, thereby obtaining three test pieces having a length of 60 mm and a width of 30 mm. These test pieces were subjected to a 180° peeling test. The test results are shown below.

| | |
|---|---|
| Aluminium plate treated with the mold release agent of the invention | 30 g/cm |
| Aluminum plate treated with Frekote 33 | 51 g/cm |
| Non-treated aluminium plate | 355 g/cm |

EXAMPLE 5

Mold release agents having different formulations shown in Table 6 were prepared by a method shown below. These mold release agents were used for a release test wherein rigid urethane foam was molded.

COMPONENTS OF MOLD RELEASE AGENT

The phosphoric acid esters employed are indicated in Table 6 by letters A, B, . . . , which correspond to the following compounds.

(A) $(CF_3)_2CF(CF_2CF_2)_3CH_2CH(OH)CH_2OPO(OH)_2$
(B) $C_8F_{17}SO_2N(C_2H_5)CH_2CH_2OPO(OH)_2$
(C), (D) and (E) The same compounds as those indicated by letters (C), (D) and (E) of Example 3, respectively.

The surface active agents employed are indicated in Table 6 by FIGS. (1), (2) . . . , which correspond to the following compounds.

(1) Nissan Nymeen L-207 (polyoxyethylene dodecylamine, product of Japan Oil and Fats Co., Ltd.)
(2) Nissan Nonion HS206 (polyoxyethylene octylphenol ether, product of Japan Oil and Fats Co., Ltd.)
(3) Nissan Nonion HS208 (polyoxyethylene octylphenyl ether, product of Japan Oil and Fats Co., Ltd.)
(4) Nissan Nymeen S-220 (polyoxyethylene alkylamine, product of Japan Oil and Fats Co., Ltd.)
(5) ammonium perfluorooctanoate The silicone oils and high fluorine compounds employed are indicated in Table 6 by small letters (a), (b), (c) . . . , which correspond to the following compounds, respectively.

(a) Toray Silicon SH 200 (dimethylsiloxane with a viscosity of 350 c.st., product of Toray Silicon Co.)
(b) Toray Silicon SH 200 (1000 c.st.)
(c) Fluorosilicon FS-1265
(d) $F[CF(CF_3)CF_2O]_4CHCFCF_3$
(e) $Cl(CFClCF_2)_3Cl$
(f) $(CF_3)_2CF(CF_2)_4CF(CF_3)_2$

METHOD FOR PREPARATION OF MOLD RELEASE AGENTS

Various kinds of mold release agents were prepared by dissolving in the solvent the above-indicated components in different ratios shown in Table 6. In Table 6, the amount of the phosphoric acid ester is one part by weight, and the kind of solvent is shown by the following abbreviations.

IPA: isopropanol, MC: methylchloroform, TTE: 1,1,2-trichlorotrifluoroethane, E: ethanol, DTE: 1,2-difluorotetrachloroethane, Tol: toluene, AC: acetone.

RELEASE TEST AND RESULTS

The thus prepared mold release agents were subjected to a release test in the same manner as in Example 3 wherein rigid urethane foam was molded. The test results as well as the formulations of the respective mold release agents are as shown in Table 6 below.

Experiment No. 4, for example, 100 g of the phosphoric acid solution and 15 g of the highly fluorinated compound solution were mixed with each other, followed by mixing with 479.2 g of IPA and 555.8 g of 1,1,2-trifluorotrichloroethane and agitating well to obtain 1150 g of a mold release agent with a concentration of 1%. Mold release agents Nos. 5 and 6 were prepared by a similar procedure. In Table 7, the highly fluorinated compound is indicated by small letter (f) which corresponds to that of Example 5.

PREPARATION OF MOLD RELEASE AGENTS FOR COMPARATIVE PURPOSE

Table 6

|   | experiment No. | kind of phosphoric acid ester | surface active agent kind | surface active agent amount (parts) | silicone oil or high fluorine compound kind | silicone oil or high fluorine compound amount (parts) | conc. of mold release agent (%) | release ability | lifetime (number of repetitions) | solvent kind | solvent mixing ratio |
|---|---|---|---|---|---|---|---|---|---|---|---|
| Ex. | 1 | (A) | (1) | 0.25 | — | 0 | 1 | 5 | 12 | IPA | — |
|  | 2 | (A) | — | 0 | (a) | 0.5 | 3 | 5 | 15 | IPA/MC | 2/1 |
|  | 3 | dimethylamine salt of (A) | (2) | 0.25 | (d) | 1 | 1 | 5 | 14 | IPA/TTE | 1/4 |
|  | 4 | NH₄ salt of (B) | (3) | 0.4 | — | 0 | 1 | 5 | 11 | IPA/water | 9/1 |
|  | 5 | (C) | (4) | 0.25 | — | 0 | 1 | 4–5 | 8 | E/DTE/TTE | 1/1/2 |
|  | 6 | (D) | — | 0 | (e) | 0.5 | 1 | 5 | 7 | TTE | — |
|  | 7 | (E) | — | 0 | (c) | 1 | 1 | 4–5 | 9 | TTE/DTE | 1/1 |
|  | 8 | diethanolamine salt (G) | — | 0 | (b) | 2 | 1 | 4–5 | 8 | IPA/Tol | 1/1 |
|  | 9 | (G) | (4) | 0.2 | (a) | 0.4 | 1 | 4–5 | 12 | Ac/MC | 1/1 |
| Comparative Ex. | 1 | (A) | — | — | — | — | 1 | 4 | 3 | IPA | — |
|  | 2 | — | (a) alone | | | | 1 | 2 | 0 | Tol | — |
|  | 3 | — | (c) alone | | | | 1 | 3 | 1 | TTE | — |
|  | 4 | — | (e) alone | | | | 1 | 3 | 1 | TTE | — |
|  | 5 | — | (a)/(5) = 5/1 | | | | 1 | 2 | 0 | IPA/MC | 1/1 |

EXAMPLE 6

Preparation of Mold Release Agents

Experiment Nos. 1, 2 and 3:

The phosphoric acid ester (A) of Example 5 and Toray Silicon SH 200 (1000 c.st.) were introduced into a mixed solvent (IPA/methylchloroform = 2/1) at such a ratio and concentrations as indicated in Table 7, followed by heating to about 50° C. and shaking for dissolution. In Table 7, the silicone oil is indicated by small letter (b) which corresponds to that of Example 5.

Experiment Nos. 4, 5 and 6:

A 10% solution of the phosphoric acid ester (A) of Example 5 in IPA and a 10% solution of a highly fluorinated compound, (CF₃)₂CF(CF₂)₄CF(CF₃)₂, in 1,1,2-trifluorotrichloroethane were prepared, respectively. The two solutions were mixed with each other at a mixing ratio of the phosphoric acid ester and the high fluorine compound as indicated in Table 7. Then, each mixture was diluted with IPA and 1,1,2-trifluorotrichloroethane to adjust the concentration of the mold release agent to that indicated in Table 7. With the mold release agent of Experiments Nos. 1–3:

The same kinds of the phosphoric acid ester, silicone oil and highly fluorinated compound as used in the above Example 6 were used for preparing three mold release agents having the compositions shown in Table 7. In Table 7, the abbreviations for solvent have the same meanings as those indicated in Example 5.

RELEASE TEST AND RESULTS

The various kinds of mold release agents thus obtained were each subjected to a release test for molding of an epoxy resin in the same manner as in Example 1. The mold release agent compositions and test results are as summarized in Table 7 below.

Table 7

|   | experiment No. | kind of phosphoric acid ester | Silicone oil or high fluorine compound kind | Silicone oil or high fluorine compound amount (parts) | conc. of mold release agent (%) | release ability | lifetime (number of repetitions) | solvent kind | solvent mixing ratio |
|---|---|---|---|---|---|---|---|---|---|
| Ex. | 1 | (A) | (b) | 0.25 | 1 | 5 | 6 | IPA/MC | 2/1 |
|  | 2 | (A) | " | 1.0 | 1 | 5 | 6 | IPA/MC | " |
|  | 3 | (A) | " | 4.0 | 1 | 4 | 5 | IPA/MC | " |
|  | 4 | (A) | (f) | 0.15 | 1 | 5 | 5 | IPA/TTE | 1/1 |
|  | 5 | (A) | " | 0.3 | 1 | 5 | 6 | IPA/TTE | " |
|  | 6 | (A) | " | 1.5 | 3 | 5 | 8 | IPA/TTE | " |
| Comparative Ex. | 1 | (A) | — | 0 | 1 | 3 | 1 | IPA | — |
|  | 2 | — | (b) alone | | 1 | 1 | 0 | Tol | — |
|  | 3 | — | (f) alone | | 1 | 3 | 1 | TTE | — |

EXAMPLE 7

Mold release agents having different compositions as shown in Table 8 were prepared by the following method. The mold release agents thus prepared were each subjected to a release test wherein rigid urethane foam was molded.

COMPONENTS OF MOLD RELEASE AGENTS

The phosphoric acid esters used are indicated in Table 8 by letters (A), (B), ..., which correspond to the following compounds, respectively.

(A) $[(CF_3)_2CF(CF_2CF_2)_3CH_2CH(OH)CH_2O]_n$-$PO(OH)_{3-n}$ (where $n$ is 2 or 3 and average value of $n$ is 2.3)

(B) ammonium salt of $[C_8F_{17}SO_2N(C_2H_5)CH_2CH_2O]_2$-$PO(OH)$ (C) $(C_7F_{15}CH_2CH_2O)_2PO(OH)$ (D) $[(CF_3)_2CF(CF_2CF_2)_3CH_2CH_2CH_2O]_nPO(OH)_{3-n}$ (where $n$ is 2 or 3 and average value of $n$ is 2.3)

(E) $[(CF_3)_2CF(CF_2CF_2)_3CH_2CH(Cl)CH_2O]_2PO(OH)$

The surface active agents used are indicated in Table 8 by numerals (1), (2) ..., which correspond to the following compounds, respectively.

(1) Nissan Nymeen L-207 (polyoxyethylene alkylamine)
(2) Nissan Nonion O-2 (polyoxyethylene monooleate)
(3) Nissan Nonion HS 206 (polyoxyethylene octylphenyl ether)

These are products of Japan Oil Fats Co.

(4) diethanolamine salt of oleic acid
(5) ammonium perfluorooctanoate

The silicone oils and high fluorine compounds are indicated in Table 8 by letters (a), (b), (c) ..., which correspond to the following compounds, respectively.

(a) Toray Silicon SH 200 (dimethylsiloxane with a viscosity of 350 c.st.)
(b) Fluorosilicon FS-1265

Both are products of Toray Silicon Co.

(c) $F[CF(CF_3)CF_2O]_4CHFCF_3$
(d) $(CF_3)_2CF(CF_2)_4CF(CF_3)_2$
(e) perfluorotributylamine
(f) $Cl(CFClCF_2)_3Cl$

METHOD FOR PREPARATION OF MOLD RELEASE AGENTS

The above-mentioned components were dissolved in a solvent as indicated in Table 8, to prepare various mold release agents. The abbreviations for the solvents shown in Table 8 have the same meanings as those in Example 5.

RELEASE TEST AND RESULTS

The thus prepared mold release agents were each subjected to a release test for rigid urethane foam in the same manner as used in Example 3. The test results are as shown in Table 8 below.

EXAMPLE 8

The mold release agents prepared in Example 7 were each subjected to another release test using an epoxy resin as a molding material. The test results are as shown in Table 9 below. The release test method was the same as that described in Example 1.

Table 9

| | Experiment No. for preparation of mold release agent | release test results | |
|---|---|---|---|
| | | release ability | lifetime |
| Ex. | 1 | 4 | 5 |
| | 2 | 5 | 6 |
| | 3 | 5 | 5 |
| | 4 | 4 | 5 |
| | 5 | 5 | 6 |
| | 6 | 5 | 6 |
| | 7 | 4 | 5 |
| | 8 | 5 | 5 |
| Comparative Ex. | 1 | 3 | 1 |
| | 2 | 1 | 0 |
| | 3 | 3 | 1 |
| | 4 | 3 | 1 |
| | 5 | 3 | 2 |

EXAMPLE 9

Three solutions A, B and C having formulations shown below were first prepared, respectively, and were each mixed with an additive and a solvent as shown in Table 10 in the weight ratio indicated in Table 10, to obtain a mold release agent. A release test of the thus prepared mold release agents was conducted for molding rigid urethane foam in the same manner as in Example 3. The test results are as shown in Table 10.

Solution A: solution of 10%

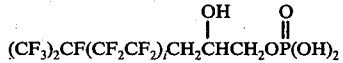

(i.e., a mixture of compounds of the above general formula in which $i$ = 3, 4, 5 and 6, in a mixing ratio (by weight) 5:3:2:1) in 1,1,2-trifluorotrichloroethane Solution B: solution of 10%

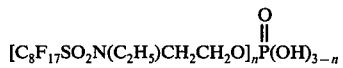

Table 8

| Experiment No. | kind of phosphoric acid ester | surface active agent kind | surface active agent amount (parts) | silicone or high fluorine compound kind | silicone or high fluorine compound amount (parts) | solvent kind | solvent amount (parts) | conc. of mold release agent (%) | release ability | lifetime (number of repetitions) |
|---|---|---|---|---|---|---|---|---|---|---|
| 1 | (A) | (1) | 0.25 | — | 0 | IPA/TTE | ½ | 1 | 5 | 10 |
| 2 | (A) | — | 0 | (a) | 0.5 | " | ½ | 1 | 5 | 13 |
| 3 | (A) | (2) | 0.25 | (c) | 1 | " | " | 1 | 5 | 14 |
| 4 | NH₄ salt of (B) | (3) | 0.5 | (d) | 2 | AC/TTE | " | 1 | 5 | 15 |
| 5 | NH₄ salt of (B) | (3) | 0.5 | (a) | 2 | AC/TTE | " | 0.5 | 5 | 12 |
| 6 | (C) | — | 0 | (e) | 3 | TTE | — | 1 | 5 | 10 |
| 7 | (D) | — | 0 | (f) | 0.5 | TTE | — | 1 | 5 | 9 |
| 8 | (E) | (4) | 0.1 | (b) | 0.25 | AC/TTE | 1/1 | 1 | 5 | 11 |
| Comparative Ex. 1 | (A) | — | 0 | — | 0 | TTE | — | 1 | 3 | 1 |
| 2 | — | (a) alone | | | | Tol | — | 1 | 2 | 0 |
| 3 | — | (d) alone | | | | TTE | — | 1 | 4 | 1 |
| 4 | — | (e)/(3) = 1/1 | | | | AC/TTTE | 1/1 | 1 | 4 | 1 |
| 5 | — | (c)/(2) = 5/1 | | | | " | ½ | 1 | 4 | 2 |

(i.e., a mixture of compounds of the above general formula in which n = 1 and 2, in a mixing ratio (by weight) 2:1) in 1,1,2-trifluorotrichloroethane Solution C: solution of 10% carbauna wax in toluene The additives indicated by numbers (1), (2), (3) and (4) in Table 10 are those corresponding to the following compounds.
(1) silicon oil: Toray Silicon SH 200 (dimethylsiloxane with a viscosity of 350 c.st., product of Toray Silicon Co.)
(2) PTFE powder: polytetrafluoroethylene powder ("Lublon L-5", product of Daikin Kogyo Co., Ltd.)
(3) Cl(CF$_2$CFCl)$_3$Cl (liquid)
(4) carbon monofluoride (powder)

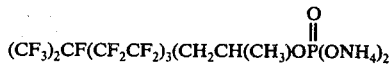

in 10 parts of acetone and then mixing the resulting solution with 80 parts of water.

Solution C: solution of micro wax emulsified by the following ingredients

| Micro wax (m.p. 87° C) | 20 parts |
|---|---|
| $C_{18}H_{37}\overset{O}{\overset{\|}{C}}O(CH_2CH_2O)_{15}H$ (surface active agent) | 4 parts |

Table 10

| | experiment No. | phosphoric acid ester solution A (parts) | solution B (parts) | wax solution solution C (parts) | additives kind | amount (parts) | solvent kind | amount (parts) | test results release ability | lifetime |
|---|---|---|---|---|---|---|---|---|---|---|
| Ex. | 1 | 10 | — | 90 | — | — | — | — | 5 | 8 |
| | 2 | — | 10 | 90 | — | — | — | — | 5 | 6 |
| | 3 | 20 | — | 70 | (1) | 1 | toluene | 9 | 5 | 10 |
| | 4 | — | 20 | 70 | (1) | 1 | " | 9 | 5 | 7 |
| | 5 | 10 | — | 20 | (1) | 1 | C$_2$F$_3$Cl$_3$ | 69 | 5 | 3 |
| | 6 | 20 | — | 70 | (2) | 5 | toluene | 5 | 5 | 9 |
| | 7 | 20 | — | 70 | (3) | 1 | " | 9 | 5 | 10 |
| | 8 | 20 | — | 70 | (4) | 5 | " | 5 | 5 | 9 |
| Comparative Ex. | 1 | 10 | — | — | — | — | C$_2$F$_3$Cl$_3$ | 90 | 5 | 2 |
| | 2 | — | 10 | — | — | — | " | 90 | 5 | 2 |
| | 3 | — | — | 100 | — | — | — | — | 4 | 1 |
| | 4 | — | — | 10 | — | — | toluene | 90 | 2 | 0 |

EXAMPLE 10

Three solutions A, B and C having the formulations shown below, respectively, were prepared, and were each mixed with the additive shown in Table 11 and water in the weight ratio indicated in Table 11, thereby obtaining a mold release agent. These mold release agents were subjected to a release test for molding an epoxy resin in the same manner as in Example 1. The test results are as shown in Table 11.

Solution A: aqueous solution obtained by dissolving 10 parts of

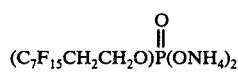

in 10 parts of isopropyl alcohol and then mixing the resulting solution with 80 parts of water.

Solution B: aqueous solution obtained by dissolving 10 parts of

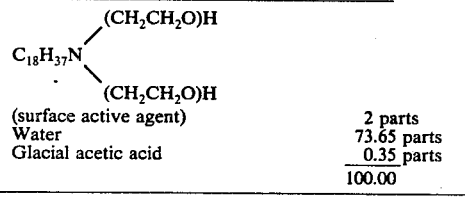

| (surface active agent) | 2 parts |
|---|---|
| Water | 73.65 parts |
| Glacial acetic acid | 0.35 parts |
| | 100.00 |

The micro wax and the surface active agents were heated and mixed with each other, to which was added hot water with gentle agitation. The resulting mixture was cooled to a certain extent and then galcial acetic acid was added with agitation to obtain an emulsion.

The additives indicated by numerals (1), (2), (3) and (4) have the same meanings as mentioned in Example 9.

Table 11

| | experiment No. | phosphoric acid ester solution A (parts) | solution B (parts) | wax emulsion solution C (parts) | additives kind | amount (parts) | water (parts) | test results release ability | life time |
|---|---|---|---|---|---|---|---|---|---|
| Ex. | 1 | 10 | — | 40 | — | — | 50 | 5 | 4 |
| | 2 | — | 10 | 40 | — | — | 50 | 5 | 4 |
| | 3 | 20 | — | 30 | (1) | 1 | 49 | 5 | 8 |
| | 4 | 20 | — | 30 | (2) | 1 | 49 | 5 | 8 |
| | 5 | 20 | — | 30 | (3) | 5 | 45 | 5 | 6 |
| | 6 | 20 | — | 30 | (4) | 5 | 45 | 5 | 6 |
| | 7 | 20 | — | 30 | — | — | 50 | 5 | 5 |
| | 8 | — | 20 | 5 | — | — | 75 | 5 | 5 |
| Comparative Ex. | 1 | 10 | — | — | — | — | 90 | 4 | 2 |
| | 2 | — | 10 | — | — | — | 90 | 5 | 2 |
| | 3 | — | — | 50 | — | — | 50 | 4 | 1 |
| | 4 | — | — | 5 | — | — | 95 | 2 | 0 |

We claim:
1. A composition comprising
   a. a perfluoroalkyl group-containing phosphoric acid ester represented by the formula:

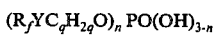

wherein: R$_f$ represents a perfluoroalkyl having 4 to 20 carbon atoms;

Y is CH$_2$CH(Z) where Z is H, CH$_3$, C$_2$H$_5$, Cl or OR where R is H, CH$_3$, C$_2$H$_5$, COCH$_3$, COC$_2$H$_5$ or CH$_2$COOH or its salt, or SO$_2$N(R') where R' is an alkyl group having 1 to 4 carbon atoms;

$q$ is an integer of 0 to 4 when Y is CH$_2$CH(Z) or 1 to 4 when Y is SO$_2$N(R'); and $n$ is an integer of 1 to 3, or a salt thereof;

b. a non-curable polysiloxane having a boiling point of at least 100° C. and a melting point not higher than 150° C. or a highly fluorinated organic compound, said highly fluorinated organic compound being a liquid or solid at room temperature and having a melting point below 150° C., and c. a liquid carrier.

2. A composition according to claim 1 wherein (b) is said polysiloxane.

3. A composition according to claim 2 wherein said polysiloxane is present in an amount 0.05 to 10 parts by weight per one part by weight of said perfluoroalkyl group-containing phosphoric acid ester.

4. A composition according to claim 1 wherein (b) is said highly fluorinated organic compound.

5. A composition according to claim 4 wherein said highly fluorinated organic compound is present in an amount 0.05 to 10 parts by weight per one part by weight of said perfluoroalkyl group-containing phosphoric acid ester.

6. A composition according to claim 4 wherein said highly fluorinated compound is selected from the group consisting of highly fluorinated alkanes, highly fluorinated inner olefins, highly fluorinated polyesters and highly fluorinated amines.

7. A composition according to claim 1 wherein said liquid carrier comprises water.

8. A composition according to claim 1 wherein said liquid carrier comprises an organic solvent.

9. A composition according to claim 8 wherein said organic solvent is selected from the group consisting of acetone, isopropanol, trichlorofluoromethane, 1,2-difluorotetrachloroethane and 1,1,2-trichlorotrifluoroethane.

10. A composition according to claim 1 wherein the total amount of (a) and (b) ranges from 0.1 to 50 weight %.

11. A composition according to claim 1 wherein said integer $n$ is 1 or 2.

* * * * *

UNITED STATES PATENT AND TRADEMARK OFFICE
CERTIFICATE OF CORRECTION

PATENT NO. : 4,118,235　　　　　　　　　　　　　　　　Page 1 of 3
DATED : October 3, 1978
INVENTOR(S) : NORIO HORIUCHI ET AL It is certified that error appears in the above-identified patent and that said Letters Patent are hereby corrected as shown below:

Column 1, Line 21, "in" should be omitted;

Column 1, Line 47, before the word "wherein" insert --- ( ---;

Column 4, Line 30, "(b.p. 203°C.), $C_2F_5CFClCF_2CRCl_2$ (b.p. 119°C.)," should read --- (b.p. 203°C.), $C_2F_5CFClCF_2CFCl_2$ (b.p. 119°C.), ---;

Column 5, Line 12, "of" should read --- or ---;

Column 8, Line 2, "position" should read --- portion ---;

Column 8, Line 29, "applied" should be omitted;

Column 11, Line 42, delete "added" and insert --- mixed ---;

Column 15, TABLE 6, under the column heading "experiment No.", delete the dash and insert --- 2 ---;

UNITED STATES PATENT AND TRADEMARK OFFICE
CERTIFICATE OF CORRECTION

PATENT NO. : 4,118,235
DATED : October 3, 1978
INVENTOR(S) : NORIO HORIUCHI ET AL It is certified that error appears in the above-identified patent and that said Letters Patent are hereby corrected as shown below:

Column 15, TABLE 6, subtitle "kind of phosphoric acid ester", the last symbol "(A)" should be aligned with the previous symbols directly above it.

Claim 1 should read as follows:

1. A mold release composition comprising a) a perfluoroalkyl group-containing phosphoric acid ester represented by the formula:

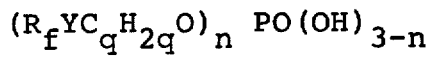

$$(R_f Y C_q H_{2q} O)_n PO(OH)_{3-n}$$

wherein: $R_f$ represents a perfluoroalkyl having 4 to 20 carbon atoms;

Y is $CH_2CH(Z)$ where Z is H, $CH_3$, $C_2H_5$, Cl or OR where R is H, $CH_3$, $C_2H_5$, $COCH_3$, $COC_2H_5$ or $CH_2COOH$ or a salt of $CH_2COOH$, or $SO_2N(R')$ where R' is an alkyl group having 1 to 4 carbon atoms:

q is an integer of 0 to 4 when Y is $CH_2CH(Z)$ or 1 to 4 when Y is $SO_2N(R')$; and n is an integer of 1 to 3, or a salt thereof;

UNITED STATES PATENT AND TRADEMARK OFFICE
CERTIFICATE OF CORRECTION

PATENT NO. : 4,118,235
DATED : October 3, 1978
INVENTOR(S) : NORIO HORIUCHI ET AL It is certified that error appears in the above-identified patent and that said Letters Patent are hereby corrected as shown below:

Claim 1 (continued):

b) an additive selected from the group consisting of non-curable polysiloxanes and highly fluorinated organic compounds, said additive being a liquid or solid at room temperature and having a boiling point not lower than 100°C and a melting point not higher than 150°C; and c) a liquid carrier.

Signed and Sealed this

Tenth Day of April 1979

[SEAL]

Attest:

RUTH C. MASON
Attesting Officer

DONALD W. BANNER
Commissioner of Patents and Trademarks